No. 721,380. PATENTED FEB. 24, 1903.
R. L. MORGAN.
VEHICLE WHEEL.
APPLICATION FILED FEB. 3, 1902.
NO MODEL
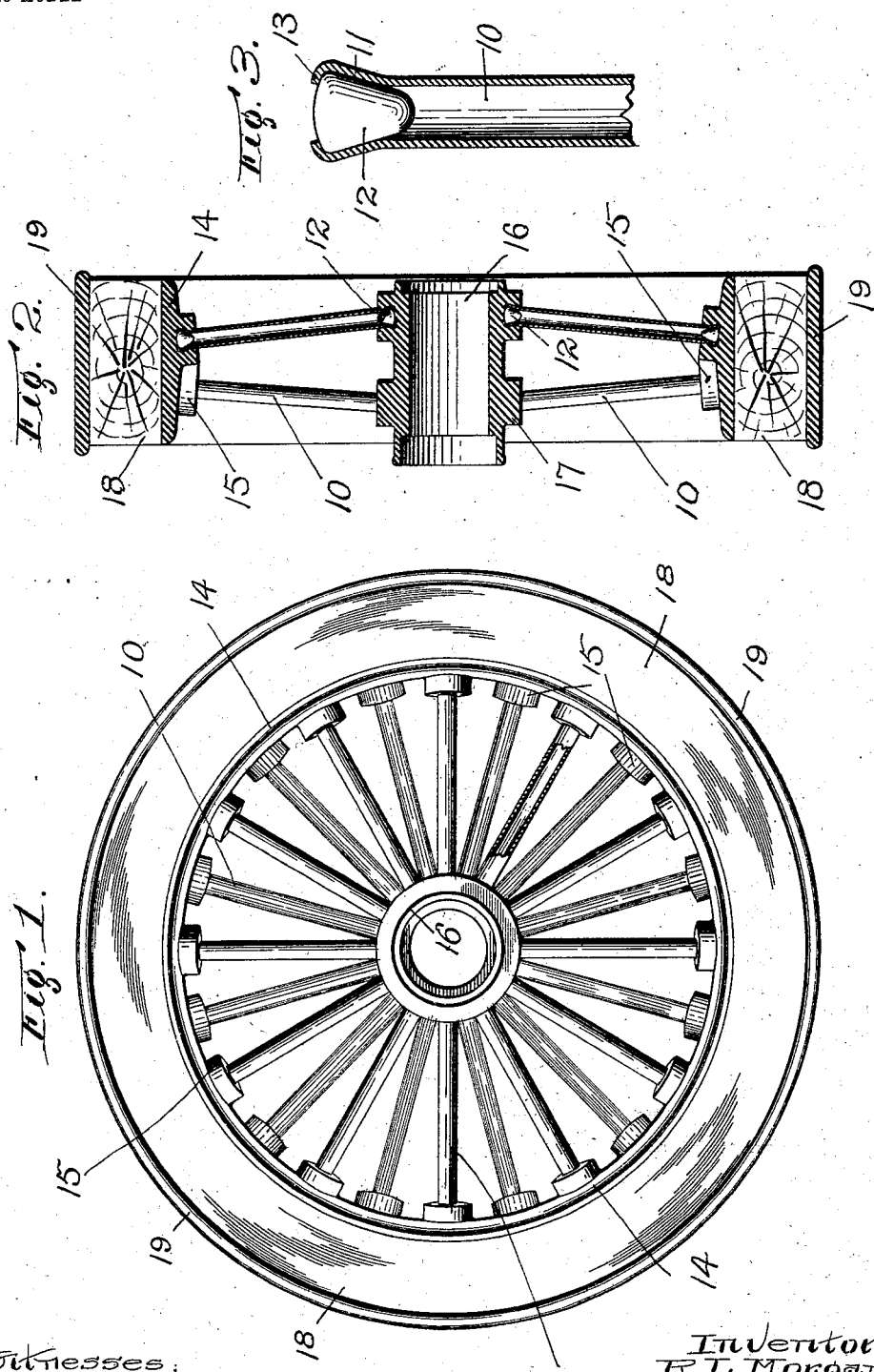

UNITED STATES PATENT OFFICE.

RALPH L. MORGAN, OF WORCESTER, MASSACHUSETTS.

VEHICLE-WHEEL.

SPECIFICATION forming part of Letters Patent No. 721,380, dated February 24, 1903.

Application filed February 3, 1902. Serial No. 92,355. (No model.)

*To all whom it may concern:*

Be it known that I, RALPH L. MORGAN, a citizen of the United States, residing at Worcester, in the county of Worcester and State of Massachusetts, have invented a new and useful Vehicle-Wheel, of which the following is a specification.

This invention relates to a wheel which has been especially designed for use on motor-trucks, traction-engines, or for similar purposes.

The especial object of this invention is to provide a light, strong, and durable form of wheel in which a casting operation is employed for securing the parts together and which is so constructed that cast metal may be employed without creating internal stresses due to the cooling of the metal.

A further object of this invention is to provide a cushioned wheel having a metallic center part, a metallic tire with a cushioning felly of wood or similar material interposed between the center part and tire of the wheel.

To these ends this invention consists of the vehicle-wheel as an article of manufacture and of the combination of parts therein, as hereinafter described, and more particularly pointed out in the claims at the end of this specification.

In the accompanying drawings, Figure 1 is a side view of a vehicle-wheel constructed according to this invention. Fig. 2 is a transverse sectional view of the same, and Fig. 3 is an enlarged detail view of one of the spokes.

In manufacturing vehicle-wheels for trucks, traction-engines, or for similar purposes it is desirable to employ cast-iron to as large an extent as possible. Solid cast-iron wheels cannot, however, be used to advantage for purposes of this kind on account of the weakness of such wheels, due to internal stresses caused by the unequal cooling of the cast metal and on account of their comparatively heavy weight.

The especial object of my present invention is therefore to provide a vehicle-wheel which is designed to utilize cast metal in such manner as to avoid all internal stresses due to the unequal cooling of the metal, while at the same time providing a vehicle-wheel of a light and strong construction. To accomplish these objects, the spokes of a wheel constructed according to my invention are formed of tubes or pipes. In the specific construction which I have herein illustrated the ends of the pipes or tubular spokes are expanded to receive conical cast-iron plugs, the ends of the tubes being closed down to hold the plugs in place.

In manufacturing a wheel the spokes are suitably supported in a mold and the rim of the wheel is first molded or poured, so that the outer ends of the spokes will be cast within the inwardly-projecting lugs or bosses of the wheel-rim. The rim is then allowed to cool or set, and as a separate operation the hub is then poured or cast to inclose the inner ends of the spokes. A wheel as thus formed may then be turned to the desired diameter and the hub bored out in the usual manner.

To provide for cushioning a wheel constructed according to this invention, the metallic center as thus constructed is provided with a cushioning felly of wood or similar material, and a tire of steel or other material is shrunk on outside the wooden felly to provide a suitable wearing-surface.

Referring to the accompanying drawings and in detail for a description of a vehicle-wheel constructed according to this invention, 10 designates the tubular spokes or pipes, each of said spokes being expanded at 11 to receive conical cast-iron plugs 12, which are held in place by closing in the ends of the tubes, as at 13. A cast-iron rim 14 is provided with inwardly-extending bosses or lugs 15, which are cast around the outer ends of the spokes. The hub 16 is provided with rings 17, which are cast around the inner end of the spokes. By first casting the rim 14 and casting the hub at a subsequent operation I have provided a composite construction in which internal stresses due to unequal cooling of the metal are entirely avoided.

The tubular spokes 10 enable me to make the construction extremely light, while the plugs 12 in the ends of the tube prevent the metal from running into the spokes.

Metallic wheels as thus constructed may be employed without further addition, although in practice in order to provide a cushioned construction which will act to deaden the noise and jar I prefer to provide wheels constructed according to my invention with a felly of wood or other cushioning material 18, having a steel or other metallic tire 19 shrunk or otherwise secured outside of the same.

I am aware that changes may be made in the construction of my vehicle-wheel by those who are skilled in the art without departing from the scope of my invention as expressed in the claims. I do not wish, therefore, to be limited to the construction or to the proportion of parts which I have herein shown and described; but What I do claim, and desire to secure by Letters Patent of the United States, is—

1. As an article of manufacture, a wheel for vehicles, having a hub, a rim, and tubular spokes with expanded ends, conical cast-iron plugs inserted therein and held in place by closing the ends of the tubes down onto the same, the ends of said spokes being secured by casting the metal of the hub and rim around the same.

2. As an article of manufacture, a wheel for vehicles, comprising a metal center part consisting of a hub, a rim, and tubular spokes having conical cast-iron plugs inserted in the expanded ends of the spokes and held in place by turning in the ends of the spokes, the ends of the spokes being secured by casting the metal of the rim and hub around the same, a steel tire, and a wooden cushioning-felly interposed between the steel tire and center part of the wheel.

3. As an article of manufacture, a composite vehicle-wheel comprising spokes, an iron rim and an iron hub successively cast around the ends of the spokes to form a wheel-center free from initial internal strains due to unequal shrinkage during cooling, a steel tire, and a felly of wood interposed between the steel tire and wheel-center, said parts being combined to provide a cast-together wheel for use on highways, substantially as described.

4. As an article of manufacture, a wheel for vehicles, consisting of a center piece, the parts of which are secured together by casting, and which comprise a hub, a rim, with tubular spokes having expanded ends suitably filled to prevent cast metal from entering said tubular spokes, said expanded ends being secured by casting the metal of the rim and hub around the same, a steel tire, and a wooden felly interposed between the steel tire and metal center part to protect the same from vibration and to diminish noise.

In testimony whereof I have hereunto set my hand in the presence of two subscribing witnesses.

RALPH L. MORGAN.

Witnesses:
WM. V. LOWE,
E. L. THROWER.